(12) United States Patent
De Mendizabal Zalaikin et al.

(10) Patent No.: US 9,790,404 B2
(45) Date of Patent: Oct. 17, 2017

(54) DRY BONDING ACRYLATE ADHESIVE LAYERS

(71) Applicant: Henkel AG & Co. KGaA, Duesseldorf (DE)

(72) Inventors: Julen De Mendizabal Zalaikin, Barcelona (ES); Elisabeth Torres Cano, Barcelona (ES); Dennis Bankmann, Duesseldorf (DE); Roberto Pela, Tarragona (ES); Sandra Niembro, Barcelona (ES); Vincent Leon, Nicole (FR)

(73) Assignee: Henkel AG & Co. KGaA, Duesseldorf (DE)

(*) Notice: Subject to any disclaimer, the term of this patent is extended or adjusted under 35 U.S.C. 154(b) by 366 days.

(21) Appl. No.: 14/310,337

(22) Filed: Jun. 20, 2014

(65) Prior Publication Data

US 2014/0299261 A1 Oct. 9, 2014

Related U.S. Application Data

(63) Continuation of application No. PCT/EP2012/075930, filed on Dec. 18, 2012.

(30) Foreign Application Priority Data

Dec. 21, 2011 (EP) .................................. 11194769

(51) Int. Cl.
| | | |
|---|---|---|
| C09J 4/06 | (2006.01) | |
| C09J 151/06 | (2006.01) | |
| B32B 37/12 | (2006.01) | |
| C09J 7/02 | (2006.01) | |
| C08F 220/06 | (2006.01) | |
| C08F 222/10 | (2006.01) | |
| C08F 220/28 | (2006.01) | |

(52) U.S. Cl.
CPC ................ C09J 4/06 (2013.01); B32B 37/12 (2013.01); C09J 7/0207 (2013.01); C09J 151/06 (2013.01); C08F 220/06 (2013.01); C08F 222/1006 (2013.01); C08F 2220/283 (2013.01); C08F 2220/286 (2013.01); Y10T 428/269 (2015.01); Y10T 428/2891 (2015.01)

(58) Field of Classification Search
CPC . C09J 4/06; B32B 37/12; C07J 7/0207; Y01T 428/269; Y01T 428/2891; C08F 220/06; C08F 2220/283; C08F 2220/286
See application file for complete search history.

(56) References Cited

U.S. PATENT DOCUMENTS

| | | | |
|---|---|---|---|
| 4,477,622 A | 10/1984 | Sanderson et al. | |
| 5,387,644 A | 2/1995 | Discho | |
| 5,458,983 A | 10/1995 | Wang et al. | |
| 6,670,417 B2 | 12/2003 | Foreman et al. | |
| 2011/0213092 A1 | 9/2011 | Boyce et al. | |

FOREIGN PATENT DOCUMENTS

| | | | |
|---|---|---|---|
| DE | 4242356 A1 | 6/1994 | |
| EP | 0349645 A1 | 1/1990 | |
| EP | 1743909 A1 | 1/2007 | |
| GB | 2256645 A | 12/1992 | |
| JP | 55-123665 A1 * | 9/1980 | ............... C09J 3/14 552/113 |
| JP | S6183274 A | 4/1986 | |
| JP | S63270702 A | 11/1988 | |
| JP | H05311130 A | 11/1993 | |
| JP | H061954 A | 1/1994 | |
| JP | H0637010 A | 2/1994 | |
| JP | H0820749 A | 1/1996 | |
| JP | H08239405 A | 9/1996 | |
| JP | H08302310 A | 11/1996 | |

OTHER PUBLICATIONS

International Search Report for International Application No. PCT/EP2012/075930 dated Feb. 15, 2013.

* cited by examiner

*Primary Examiner* — Sanza McClendon
(74) *Attorney, Agent, or Firm* — James E. Piotrowski

(57) ABSTRACT

A radiation curable adhesive comprising (i) (meth)acrylic monomer(s) and/or oligomer(s), wherein said (meth)acrylic monomers or oligomers comprise 5 to 50 wt % of esters of (meth)acrylic acid with polyetherpolyols having the formula HO—$((CH_2)_m$—$O)_n$—X wherein m=2, 3 or 4; n=2 to 50; X=H, linear, branched or aromatic C1 to C12-alkyl, the ester having a molecular weight from 150 to 2000 g/mol; (ii) non-reactive (co)polymer(s) based on unsaturated monomers, wherein said unsaturated monomers are selected from vinyl esters, (meth)acrylate esters and C2 to C8 unsaturated olefins, the (co)polymer having a molecular weight from 5000 g/mol to 500000 g/mol, such adhesive can form a solid adhesive layer after being cross-linked by radiation, the layer, has a non tacky surface but can be adhesively bonded under pressure to a second layer of the adhesive.

16 Claims, No Drawings

DRY BONDING ACRYLATE ADHESIVE LAYERS

The invention relates to an adhesive based on acrylic unsaturated components which are cured by radiation to form a non tacky adhesive layer. Such adhesive layers can be bonded to similar layers by application of pressure. The invention further includes a process to manufacture substrates comprising at least one adhesive layer which layer can be bonded by contact to another similar layer. Such adhesives can be manufactured as solvent free viscous adhesive or as hot melt adhesive.

Pressure sensitive adhesives (PSA) are generally known in the art. These can bond to different substrates, they may generate repositionable bonds or they provide a stable bond which cannot be removed. Also different types of chemical compositions are known which can provide a layer of a PSA.

U.S. Pat. No. 4,477,622 discloses a contact adhesive layer which bonds to the same adhesive layer, whereby the adhesive is applied as water borne adhesive containing an acrylic latex. The adhesive shall contain also crosslinking means as aminoplast resins or peroxide crosslinkers.

U.S. Pat. No. 5,458,983 discloses an adhesive which can be applied as repositionable adhesive. The composition is disclosed as being an aqueous dispersion containing two different polyacrylates having a different particle size. Specific polymers containing C8-alkylesters are disclosed.

U.S. Pat. No. 6,670,417 discloses a pressure sensitive adhesive which is obtained by reacting a rubber macromer with an acrylic component. The macromer may comprise ethylene, propylene or butylene monomeric units, the grafted acrylic polymer shall contain the known aliphatic acrylic esters.

The application of PSA layer is subject to several problems. For normal PSA a tacky surface is an inherent feature of the adhesive. Such adhesives are difficult to provide as bulk in solid form as it is necessary that during transportation the adhesive can be separated from the container. If a solution is provided the solvents have to evaporate. This is time consuming, may be subject to health restriction and may deteriorate the substrate. If applied as adhesive, the surface remains tacky. So the surface should be protected against being spoiled by dust or other material. Alternatively the adhesive layer can be manufactured and subsequently be bonded to a second substrate.

It is the object of the present invention to provide an adhesive, which can be applied as adhesive layer, which shall be crosslinked after manufacture of the layer. The surface of the adhesive layer shall remain not tacky to substrates, so that the substrates can be stored prior to use and further processing. The adhesive shall be bonded to a surface having a corresponding layer of the adhesive by pressure.

Another object of the invention is to provide a substrate coated on certain portions of the surface with an adhesive layer, whereby the layer can be bonded to one another by pressure and the bond can be separated without destruction of the adhesive layers. Another object is a process to manufacture such substrate coated with an adhesive layer.

The object is solved by a radiation curable adhesive composition comprising (i) (meth)acrylic monomer(s) and/or oligomer(s), wherein said (meth)acrylic monomers or oligomers comprise 10 to 65 wt % of esters of (meth)acrylic acid with polyetherpolyols of the formula $$HO-((CH_2)_m-O)_n-X,$$

wherein m=2, 3 or 4; n=2 to 50; X=H, linear, branched or aromatic C1 to C12-alkyl, the ester having a molecular weight from 150 to 2000 g/mol; (ii) non-reactive (co)polymer(s) based on unsaturated monomers, wherein said unsaturated monomers are selected from vinyl esters, (meth)acrylate esters and C2 to C8 unsaturated olefins, the (co)polymer having a molecular weight from 5000 g/mol to 500000 g/mol.

The adhesive according to the invention comprises oligomers and/or monomers which can be cured by radiation. Such compounds contain at least one double bond e.g. a methacrylic ester group, an acrylic ester group or a vinyl group.

The unsaturated monomers or oligomers useful as a component in the adhesive can be selected from various acrylic or methacrylic monomers. Generally the molecular weight of this component shall be below 1000 g/mol. The glass transition temperature can be influenced by the selection of the monomers; also polar or more unpolar properties of the adhesive can be influenced by the monomers. It is also possible to incorporate (meth)acrylate monomers bearing further functional groups, such as for example OH groups, carboxyl groups, NH groups, epoxide groups or others. It is important to ensure that these functional groups do not inhibit the radiation curing reaction.

Examples for such monomers are alkyl (meth)acrylates of straight-chain, branched or cycloaliphatic alcohols having 1 to 40 C atoms, such as for example methyl (meth)acrylate, ethyl (meth)acrylate, n-butyl (meth)acrylate, i-butyl (meth)acrylate, t-butyl (meth)acrylate, pentyl (meth)acrylate, 2-ethylhexyl (meth)acrylate, stearyl (meth)acrylate, lauryl (meth)acrylate, cyclohexyl (meth)acrylate, isobornyl (meth)acrylate; ester substituted (meth)acrylates, such as (meth)acrylate esters bound to caprolactone, aryl (meth)acrylates such as for example benzyl (meth)acrylate or phenyl (meth)acrylate which can each have unsubstituted or mono- to tetra-substituted aryl residues; other aromatically substituted (meth)acrylates such as for example naphthyl (meth)acrylate; tetrahydrofurfuryl methacrylate, methoxy(m)ethoxyethyl methacrylate, 1-butoxypropyl methacrylate, cyclohexyloxymethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate.

Hydroxy-functionalized (meth)acrylates can also be used for example hydroxyalkyl (meth)acrylates of straight-chain, branched or cycloaliphatic diols having 2-36 C atoms, such as for example 3-hydroxypropyl (meth)acrylate, 3,4- dihydroxybutyl mono(meth)acrylate, 2-hydroxyethyl (meth)acrylate, 4-hydroxybutyl (meth)acrylate, 2-hydroxypropyl (meth)acrylate, 2,5-dimethyl-1,6-hexanediol mono(meth)acrylate, particularly preferably 2-hydroxyethyl methacrylate. Also other functional groups can be included for example carboxylic groups, epoxid groups, amide groups or others. Examples may include acrylic or methacrylic acid or glycidyl ester of (meth)acrylic acid.

Another group of useful components to be included in the monomers/oligomers are di-functional or more highly functional acrylate or methacrylate esters. Such acrylate or methacrylate esters comprise for example esters of acrylic acid or methacrylic acid with aromatic, aliphatic or cycloaliphatic polyols. Likewise suitable compounds are for example the acrylic acid or methacrylic acid esters of aromatic, cycloaliphatic, aliphatic, linear or branched C4-20 polyols. Examples of such components are neopentyl glycol di(meth)acrylate, 1,6-hexanediol di(meth)acrylate, trimethylolpropane tri(meth)acrylate, pentaerythritol tetra(meth) acrylate, and (meth)acrylate esters of sorbitol and other sugar alcohols. These (meth)acrylate esters of aliphatic or cycloaliphatic diols may optionally be modified with an aliphatic ester. The acrylates modified by an aliphatic ester comprise for example neopentyl glycol hydroxypivalate di(meth)acrylate, caprolactone-modified neopentyl glycol hydroxypivalate di(meth)acrylates and the like, neopentyl glycol-modified (meth)-acrylates, and trimethylolpropane di(meth)acrylates.

Trifunctional and more highly functional acrylate monomers comprise for example trimethylolpropane tri(meth) acrylate, pentaerythritol tri- and tetra(meth)acrylate, dipentaerythritol tetra(meth)acrylate, dipentaerythritol penta (meth)acrylate, dipentaerythritol hexa(meth)acrylate, caprolactone-modified dipentaerythritol hexa(meth)acrylate, pentaerythritol tetra(meth)acrylate, tris[(meth)acryloxyethyl] isocyanurate, ditrimethylolpropane tetraacrylate or caprolactone-modified tris[(meth)acryloxyethyl] isocyanurate or mixtures of two or more thereof. The highly functional (meth)acrylates may comprise preferably 3 to 6 unsaturated groups. Most preferred the functionality is selected from 3 to 4. The amount of this component and its functionality may serve to increase the cross-linking density of the adhesive.

Furthermore other copolymerizable unsaturated monomers, in particular also vinyl aromatic monomers, can be included in the composition, as far as they can be mixed with the composition. Mixtures of monomers, oligomers, monofunctional or polyfunctional compounds can be used. The amount of the (meth)acrylate monomers or oligomers shall comprise 5 to 50 wt-% of the adhesive composition, preferably 5 to 40 wt-%. In a preferred embodiment the composition shall comprise 10 to 35 wt-% of caprolactone (meth)acrylate ester.

According to the invention it is required that the composition contains (meth)acrylate esters of polyether gylcols. They can be represented by the formula esters of (meth) acrylic acid with

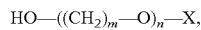

$$HO-((CH_2)_m-O)_n-X,$$

wherein m=2, 3 or 4; n=2 to 50; X=H, linear, branched or aromatic C1 to C12-alkyl, the esters having a molecular weight from 150 to 2000 g/mol. Preferably polyethylene glycol or polypropylene glycol are used, most preferred n=3 to 20. Alkylene oxide-modified (meth)acrylate compounds comprise for example mono-functional compounds like (meth)acrylate esters of polyethylene glycols, polypropylene glycols or mixtures thereof having 5-80 carbon atoms; derivatives thereof, having an ether or ester group at one end, e.g. alkylether of polyalkyleneglycol like poly(ethylene glycol) methyl ether (meth)acrylate, poly(propylene glycol) methyl ether (meth)acrylate, poly(ethylene glycol) ethyl ether (meth)acrylate, poly(propylene glycol) propyl ether (meth)acrylate; aromatic ethers of polyoxyalkyleneglycol, like poly(ethylene glycol) phenyl ether (meth)acrylate, or poly(propylene glycol) phenyl ether (meth)acrylate; polyfunctional compounds like ethylene oxide-modified neopentyl glycol di(meth)acrylates, propylene oxide-modified neopentyl glycol di(meth)acrylates, ethylene oxide-modified 1,6-hexanediol di(meth)acrylates, propylene oxide-modified 1,6-hexanediol di(meth)acrylates, polyethylene glycol di(meth)acrylates, polypropylene glycol di(meth)acrylates and the like. The amount of such (meth)acrylate substituted polyether glycols shall comprise from 5 to 50 wt-% of the total composition, preferably 5 to 40 wt-%.

Other components useful for an adhesive composition according to the invention are reactive polymeric compounds which are based on a polyester, a polyacrylate or a polyurethane structure which contain one or more unsaturated double bonds. These are normally viscous or solid compounds, the molecular weight may have a broad range from 1000 to 20000 g/mol. Such compounds shall include also mixtures of different molecular weight or different functionality as they are oligomeric reaction products. This reactive polymeric compounds shall comprise 10 to 60 wt-%.

As additional component the adhesive shall comprise a non-reactive copolymer. Non-reactive shall mean that the polymers may include functional groups like OH, COOH, epoxy and amino, but the polymer shall not react during the crosslinking of the unsaturated constituents. The copolymer can be selected from copolymers based on unsaturated monomers like: vinylesters; (meth)acrylate esters; C2 to C8 unsaturated olefins, such as (iso)butylene; or, other unsaturated monomers. Examples may include polyvinylacetate, poly(meth)acrylate-esters, polyolefin copolymers, polyisobutylene, ethylene acrylate copolymers or ethylene vinylacetate copolymers. Such copolymers are solid at room temperature (about 25° C.) and they may include amorphous or crystalline sections. The molecular weight shall be selected from 5000 to 500000 g/mol. Such polymers are known and commercially available.

Preferably the composition contains ethylene vinyl acetate copolymers (EVA). Such polymers are known and typically contain an amount of vinyl acetate from about 15 to about 50 mol % related to the sum of all co-monomers. Optionally also other co-monomers can be present. The softening point of such polymers is above 50° C. The selection of monomers will influence the properties like glass transition temperature, melting point or softening point. The amount of such non-reactive polymers is from 2 to 35 wt-% based on the adhesive composition.

An adhesive according to the invention may include up to 20 wt-% of other ingredients or additives which can be added in order to achieve the required performance properties such as, for example, cohesive strength, viscosity, softening point or stability. These adhesives may include plasticizers, stabilizers, antioxidants for improving the ageing behaviour of the adhesive, pigments or fillers, resins or waxes. Even if it is possible to dissolve the composition in solvents, according to the invention the adhesive is free of organic solvents.

The stabilizers, more particularly UV stabilizers, or antioxidants suitable for use as additives in accordance with the present invention include phosphites, phenols, sterically hindered phenols of high molecular weight, sterically hindered amines (HALS), polyfunctional phenols, sulfur- and phosphorus-containing phenols. Suitable compounds in the context of the invention are, for example, hydroquinone, hydroquinone methyl ether or phenothiazine. They are added to the adhesive in quantities of typically from about 0.1 to 3.0% by weight. The selection and the properties are known to the person skilled in the art.

The adhesive composition may optionally comprise natural or synthetic resins. The natural resins may be of vegetable or of animal origin. Examples of resins include shellac and colophony, gum resins or wood resins. Not only the native natural resins, but also their derivatives are usable, whether these be obtained by disproportionation, dimerisation, hydrogenation, polymerisation, esterification, salt formation or by addition of unsaturated compounds. Examples or synthetic resins include hydrocarbon, terpene, coumarone/indene, furan, alkyd, aldehyde, ketone, phenol, glycerol ester, polyester, polyamide type, epoxy or urea resins. The plasticizer is preferably used for viscosity adjustment. Suitable plasticizers include medicinal white oils, naphthenic mineral oils, phthalates, adipates, polypropylene, liquid polyesters, benzoate esters, hydrogenated plasticizers or monohydric or polyhydric alcohols with a molecular weight of 1000 to 6000 g/mol. Molecular weight is number average molecular weight, Mn, to be measurable by GPC. Such plasticizers are selected so that they are fully compatible with the adhesive. The amount shall be from 0 to 10 wt-%, but preferably no resins and/or plasticizers are included.

The adhesive may additionally contain at least one photoinitiator and/or photosensitizer. Basically, any commercially available photoinitiators that are compatible, i.e. form at least substantially homogeneous mixtures, with the PSA may be used for the purposes of the invention. The photoinitiators are substances or mixtures of substances which are stable in the absence of light and, on exposure to radiation, absorb so much energy that they initiate radical or ionic polymerizations.

Suitable photoinitiators include, for example, phosphine oxide photoinitiators, benzoin alkyl ether photoinitiators, dialkoxyacetophenone initiators, aldehyde and ketone photoinitiators having at least one aromatic nucleus attached directly to the carbon atom of the carbonyl group, and alpha-hydroxyketone photoinitiators.

A photoinitiator which on irradiation with UV-light is capable of initiating free-radical polymerization of olefinically unsaturated double bonds is used as a component. For example, these are any Norrish type I fragmenting and Norrish type II substances. The quantity of photoinitiators should amount to up to 8 wt-% relative to the adhesive, in particular to between 1 and 4 wt-%. In a preferred embodiment, the photoinitiators should initiate the reaction on exposure to UV radiation or by visible radiation. The radiation-curable composition according to the invention may contain one or a mixture of said photoinitiators.

Additionally additives and/or fillers can be present as component(s) in the adhesive composition. Examples of such fillers—which shall be finely dispersed—are titanium dioxide, silicium dioxide, aluminium oxide or other metal silicates, carbonates and sulfates. The fillers may influence the viscosity of the non cured adhesive. The filler(s) shall be present in an amount so that the curing is not blocked by the filler. The amount shall be in the range from 0 to 10 wt-%.

A specific composition according to the present invention shall comprise 5 to 50 wt-% monomers of mono or poly (meth)acrylic esters, 10 to 60 wt-% (meth) acrylate substituted polymers based on polyester, polyurethanes or polyacrylates, 2 to 35 wt-% of a non-reactive polymer, preferably EVA, 5 to 50 wt-% of a polyether-based acrylic esters, 0 to 20 wt-% of additives including photoinitiators, stabilizer and/or resins, the sum of all components being 100%.

The amounts of the components can be selected according to the different preferred ranges. So the adhesive force between the adhesive layers, the glass transition temperature or the flexibility of the cross-linked polymer can be adjusted.

The adhesive according to the invention is a liquid or viscous adhesive. It is solvent free. It shall have a viscosity of 2000 to 200000 mPas at 30° C., preferably more than 20000 mPas (Brookfield, ISO EN 2555). To lower the viscosity for application the adhesive can be warmed e.g. up to 70° C., preferably up to 50° C.

Another object of the invention is a cross-linked adhesive layer applied on a substrate. As substrates useful for the invention a wide range of substrates is possible. Preferably the adhesive can be applied to flexible flat substrates, for example paper, films, webs, fabrics and other flexible materials. As substrate natural polymers can be used, for example paper, carton, cardboard and other substrates manufactured from organic fibers. Additionally, polymer substrates can be used, for example polypropylene, PVC, polyester, polyamide, polyolefin, polyurethane, BOPP and other film forming substrates. It is also possible to use multi-layer substrates.

The adhesive according to the invention can be applied in a known manner. It can be applied by different means to the substrate, e.g. nozzles, rollers, blades or by printing. According to the process of the invention the adhesive is applied in a layer of about 5 to 500 pm, preferably from 10 to 250 μm. As next process step the adhesive layer will be crosslinked by radiation. This can be performed by radiation, e.g. EB-radiation, UV-radiation or also visible light, preferably by UV radiation. The radiation curing can be performed on the warm adhesive layer or the layer is cooled. The layer can be cured by the known light or UV-emitting devices, e.g. UV-lamps like mercury vapor lamps or Xenon arc lamps or LED emitting UV or visible light. The wavelength region of about 220 to 600 nm, preferably from 350 to 410 nm is suitable. The duration of the radiation step to cross-link the film shall continue from 0.1 to 20 sec., preferably from 0.1 to 5 sec. After cross-linking the adhesive layer the substrates can be further processed.

The layer manufactured and an adhesive according to the invention can be applied partly or on the whole surface of the substrate. The adhesive layer is cured. After curing the adhesive layer is in a non-tacky state. Additionally, the adhesive layer is non-blocking. This shall mean that an adhesive layer being contacted with a similar substrate or with a different substrate does not adhere to another. It can be separated by peeling the substrates from another without deterioration of the substrate or the adhesive layer.

In the process according to the invention a layer of the adhesive as written above can be bonded to a similar layer of the adhesive. It is not important that the substrate may be different, but typically similar substrates are bonded together. The bonding can be performed by pressing two substrates coated with an adhesive layer together by slight pressure. Generally speaking, this shall include pressing the substrates together by hand without using any additional pressing device.

As a test for such bonding of substrates, two coated substrates are joined with the adhesive layers together and are squeezed by a cylinder of 1 kg being rolled forward and backward about the substrate. Thereafter, these bonded substrates can be cut and tested.

The process according to the invention provides a substrate coated with an adhesive layer. This coated area of the substrate can be bonded to a similar coated area. The bonding of such two layers can be used as one time bonding. In such case, the adhesive force of the two adhesive layers is so high that no separation of the adhesive layers is possible; the two substrates will separate by adhesive failure. One time bonding includes also the case if fiber tear of one substrate can be observed.

In another embodiment of the present invention, the bonded substrates are re-closable. In this case the bonding force of the two adhesive layers is lower than the adhesion to the substrates. It is possible to separate both substrates from another and mutual adhesive failure of the joined surfaces of the adhesive layers will be observed. As the single layer is non-tacky, also the separated layers will remain non-tacky. According to this embodiment, this adhesive layer can be bonded again to the other substrate by applying a similar force to join the substrates: This can be performed more than 3 times, in further embodiments the re-closable properties will remain for even more cycles.

Another embodiment of the invention is a flexible substrate coated on a predefined part of its surface by a cured layer of an adhesive according to the invention. Such substrate can be prepared as film, as fabric or as other flexible thin substrates. After coating and curing the adhesive it is possible to process the substrate further. It is possible to store the substrates, and for further processing it is possible to separate the substrates from another, as the adhesive layer will not bond to the non-coated side of the substrate.

It is possible to manufacture from these coated substrates other products, for example envelopes, pockets, packaging materials, hygienic articles and the like. These materials can be formed in a way that the areas of the final product, which shall be closable, are coated with an adhesive layer according to the invention. The adhesive can be selected according to the purpose. For example, in the case of envelopes it would be useful to select a coating material which is only one time closable. In the case of manufacturing pockets or bags, it is also possible to apply an adhesive layer to this product which is reclosable; in such a case after opening this packaging, it is possible to reclose it.

An adhesive layer manufactured form an adhesive composition according to the invention provides advantages in use. The coated substrates can be processed without blocking and bonding the substrate to other surfaces. This allows easy storage of the products before further processing or before use. The use of solvent free adhesives will interfere less with polymeric film substrates. Also the environmental advantages are known.

Additionally, a product coated within an adhesive layer according to the invention provides to the end-user an easy way to bond two substrates together. As the surface is non-tacky, also no dust will adhere to the surface. This improves the optical appearance and also the practical use of such adhesive layers.

EXAMPLE PROCEDURE

A reaction vessel is used comprising a mixing device and a heating bath. To this vessel the acrylate components and the inert copolymer, as described in Table 1 below, are added. This composition was mixed, stirred and heated for about 6 hours at 80° C. The copolymer was thereafter dissolved. The photoinitiators are added and mixed, then the adhesive is cooled and can be applied.

TABLE 1

| Component | Adhesive 1 (g) | Adhesive 2 (g) | Adhesive 3 (g) | Adhesive 4 (g) | Molecular weight (about) |
|---|---|---|---|---|---|
| THF-acrylate | 4.8 | 4.8 | 4.9 | 4.6 | 170 |
| Acrylic acid | | 0 | 0 | 4.6 | |
| Trimethylolpropantriacrylate | 9.6 | 0 | 0 | 0 | |
| Caproactone acrylate | 12.2 | 25 | 17.1 | 23.9 | 350 |
| PEG dimethacrylate | 9.6 | 6.7 | 9.6 | 6.4 | 730 |
| Polyethyleneglycol-acrylate | 20.1 | 0 | 24.7 | 0 | 400 |
| Polyester-acrylate | 19.2 | 27 | 19.2 | 27.5 | 5000 |
| Urethan-diacrylate | 0 | 21.2 | 0 | 22.8 | 3000 |
| EVA | 20.7 | 9.6 | 20.7 | 4.6 | |
| Irgacure 819 | 1.9 | 1.9 | 1.9 | 1.9 | |
| Irgacure 2959 | 1.9 | 1.9 | 1.9 | 1.9 | |
| $SiO_2$ | 0 | 1.9 | 0 | 1.8 Reversible | |

The adhesive mixture is homogenous and liquid at room temperature.

A layer of about 30 μm was applied by a doctor blade to a paper substrate. Curing takes place after 3 to 5 seconds under a mercury lamp (1000 W) at about 365 nm (UVALOC).

The adhesive layers showed a clear surface and were not tacky. They could be stored adjacent to another non coated substrate without sticking together.

For bonding test two substrate layers (15×80 mm) were pressed together by rolling a 1 kg roll twice across the bonded substrates. The substrates were allowed to rest for about 10 min. Then the peel values were measured by an Instron Tensile machine (speed 250 mm/min). The test results are given in Table 2 below.

TABLE 2

| | Adhesive | | | | |
|---|---|---|---|---|---|
| | -1- | -2- | -3- | -4- | |
| Substrate | Paper | Paper | Paper | PET film | |
| Tear test | 3.2 fiber tear | 4.6 fiber tear | 6 fiber tear | 8 first tear. reversible 7-5.5 2nd to 8th tear | N/15 mm |

The test results show that a one time closure is achieved and in Example 4 a reversible closure with mutual adhesive failure.

What is claimed is:

1. A radiation curable adhesive comprising:
   (i) (meth)acrylic monomer(s) and/or oligomer(s), wherein said (meth)acrylic monomers or oligomers comprise 5 to 50 wt % of esters of (meth)acrylic acid with polyetherpolyols having the formula

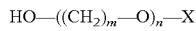

wherein: m=2,3 or 4; n=2 to 50; X=H, linear, branched or aromatic C1 to C12-alkyl, the ester having a molecular weight from 150 to 2000 g/mol; and
   (ii) non-reactive (co)polymer(s) based on unsaturated monomers, wherein said unsaturated monomers are selected from vinyl esters, (meth)acrylate esters, and C2 to C8 unsaturated olefins, the (co)polymer having a molecular weight from 5000 g/mol to 500000g/mol;
   wherein the adhesive after radiation curing is in a solid form, the solid adhesive being bondable to a second layer of the adhesive but having a non tacky surface that is non-adherent to substrates other than a second layer of the adhesive.

2. A radiation curable adhesive according to claim 1, wherein the adhesive has a viscosity from 2000 to 200000 mPas at 50° C. or from 2000 to 200000 mPas at 30° C.

3. A radiation curable adhesive according to claim 1, wherein the (meth)acrylic acid esters are selected from esters having 3 to 20 repeating units of ethylene oxide and/or propylene oxide.

4. A radiation curable adhesive according to claim 1, wherein the adhesive comprises from 2 to 35 wt-% of said non-reactive (co)polymer(s).

5. A radiation curable adhesive according to claim 1, wherein the adhesive comprises at least one additive selected from photoinitiators, adhesion promoters, fillers or stabilisers.

6. A radiation curable adhesive according to claim 1, wherein the adhesive comprises from 10 to 35 wt-% of caprolactone (meth)acrylate ester.

7. A layer of a radiation curable adhesive according to claim 1, wherein said layer is applied to a substrate selected from cellulose or polymeric material.

8. A layer of a radiation curable adhesive according to claim 1, wherein said layer is applied to a flexible film or sheet selected from cellulose or polymeric material.

9. A layer of a radiation curable adhesive according to claim 1, wherein the layer is about 5 to 500 μm thick.

10. A process for bonding substrates, wherein at least part of surfaces of said substrates are coated with a cured adhesive layer manufactured from an adhesive according to claim 1, and both layers are bonded together by pressure.

11. A process for bonding substrates according to claim 10, wherein the bonded layers can be separated by adhesive failure to one substrate or fiber tear.

12. A process for bonding substrates according to claim 10, wherein the bonded layers can be separated from another by mutual adhesive failure of the adhesive layers.

13. A process for bonding substrates according to claim 12, wherein the adhesive layers form reclosable surfaces.

14. A radiation curable adhesive according to claim 1, wherein the adhesive comprises from 2 to 35 wt-% of ethylene vinyl acetate copolymers.

15. A radiation curable adhesive according to claim 1, further comprising 10 to 60 wt % of acrylate substituted urethane.

16. A radiation curable adhesive according to claim 1, comprising:
   5 to 50 wt-% monomers of mono or poly (meth)acrylic esters,
   10 to 60 wt-% (meth) acrylate substituted polymers based on polyester, polyurethane or polyacrylate,
   5 to 50 wt-% of a polyether-based acrylic esters,
   2 to 35 wt-% of a non-reactive polymer, and
   0 to 20 wt-% of additives,
   wherein the sum of all components is 100%.

* * * * *

UNITED STATES PATENT AND TRADEMARK OFFICE
CERTIFICATE OF CORRECTION

| | |
|---|---|
| PATENT NO. | : 9,790,404 B2 |
| APPLICATION NO. | : 14/310337 |
| DATED | : October 17, 2017 |
| INVENTOR(S) | : Julen De Mendizabal Zalaikin et al. |

Page 1 of 1

It is certified that error appears in the above-identified patent and that said Letters Patent is hereby corrected as shown below:

In the Specification

Column 6, Line 18: Change "500 pm" to -- 500 µm --.

Signed and Sealed this
Sixteenth Day of October, 2018

Andrei Iancu
*Director of the United States Patent and Trademark Office*